May 30, 1967 L. ESKIJIAN 3,322,559
MECHANICAL PROCESS FOR COATING INTERIOR AT ENDS OF TUBES
Filed Oct. 19, 1965

INVENTOR.
LUTHER ESKIJIAN
BY *Harry R. Lubcke*
AGENT 3,322,559
MECHANICAL PROCESS FOR COATING
INTERIOR AT ENDS OF TUBES
Luther Eskijian, Altadena, Calif. (% Specialties Engineering Corp., 340 W. Washington Blvd., Pasadena, Calif. 91103)
Filed Oct. 19, 1965, Ser. No. 497,938
5 Claims. (Cl. 117—47)

This invention pertains to a method and certain apparatus useful in carrying out the method for coating the interior of tubes at and near the ends thereof.

A coating upon the interior wall of a tube is frequently required, particularly at the end of the tube where a liquid may enter the same. Turbulence may there cause cavitation and erosion. The coating acts to prolong the life of a new tube, or to repair a tube if it has become pitted or cavitated sufficiently to wear holes through the wall.

Since these faults usually occur within one foot of the end of the tube, I have found that a mechanical method of manipulating viscous material is effective in coating this region within the tube. The method allows rapid processing. Speed is necessary when using preferred materials and is highly desirable in commerical operation, where several thousand tubes may be processed in a single condenser.

An object of this invention is to coat the interior of tubes at and near the ends thereof.

Another object is to accomplish the process of coating by mechanical manipulation of the coating material.

Another object is to repair tubes that have become cavitated or corroded, with or without holes, near the ends of the tubes.

Another object is to process the interior of tube ends rapidly, at low cost, and with simple apparatus.

Other objects will become apparent upon reading the following specification and upon examining the accompanying drawings, in which are set forth by way of illustration and example certain embodiments of this invention.

In the figures the tube being processed is always shown in section and the viscous material in phantom so that the process can be clearly presented.

Figure 1:
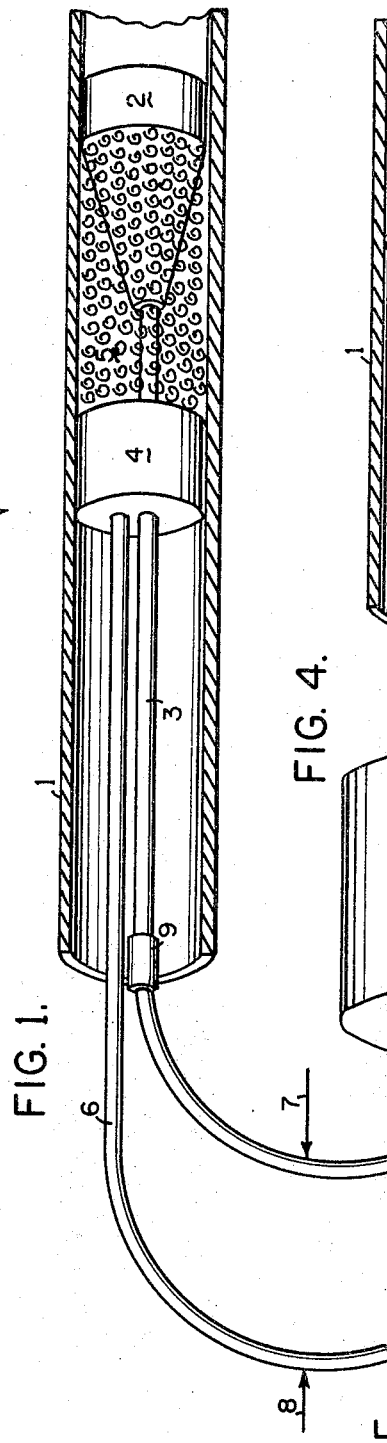
FIG. 1 illustrates the coating process.

In FIG. 1, numeral 1 indicates the tube being processed. This may be of any size or shape, but typically is a horizontally disposed hollow cylindrical tube of a condenser or heat exchanger having a diameter in the range of from ½" to 1" and a length of perhaps up to 50 feet, with steam as the working substance and water as the coolant.

Spreader plunger 2 has a conical forward portion and a contiguous cylindrical rear portion; the former is about one inch long for a plunger ⅝" diameter and the cylindrical portion is approximately half as long as the conical portion. A true conical shape is employed, to prevent viscous material from remaining on the plunger, as occurs if the conical portion is concave when viewed in section. For coating a ⅝" diameter tube (inside diameter), the cylindrical portion of the plunger is machined 0.006" smaller than the inside diameter of the tube. This clearance allows the viscous material to flow past the plunger and to coat the tube in the processing. Teflon is a suitable material for the plunger.

The above-described spreader plunger is rigidly fastened to a first rod 3, by means of a tight fit within an axially disposed hole and a nut upon the threaded rear (right) end of the rod. The nut is not seen in FIG. 1 because of the nature of the view. Stainless steel or Monel metal are suitable materials from which to make the rod, which may be ⅛" in diameter. The length of the rod should exceed the length of the tube to be treated by several inches. This is to allow for the curved front end of the rod and for the minor extension that is threaded at the rear of the cylindrical portion of the spreader plunger.

In carrying out the process a pressure plunger 4 is also provided. This element has an axial hole to provide a free sliding fit upon first rod 3, but this hole must not be larger than necessary, lest the viscous material leak past it while under pressure during the processing. Similarly, the outer diameter of the pressure plunger must be a relatively tight sliding fit within tube 1 to prevent leakage.

In FIG. 1, which may be taken as illustrating the relation betwen elements at the start of coating, viscous material 5 fills the space between spreader plunger 2 and pressure plunger 4. A second rod 6 is employed, and merely butts against pressure plunger 4. It is formed in a curve at the manipulative end, as was rod 3, and may be of the same material and of the same diameter as that rod.

In accomplishing the processing, first rod 3, carrying spreader plunger 2, is entered into the tube, ultimately to the distance to which the tube is to be coated. This distance can be conveniently judged for this and other tubes by the position of distance adjuster 9. This element is a sleeve upon rod 3, with a provision for affixing the same to the rod at any desired distance for a given job. The provision may take the form of a set screw or of adhesive which can be knocked free by a sharp rap.

Figure 3:
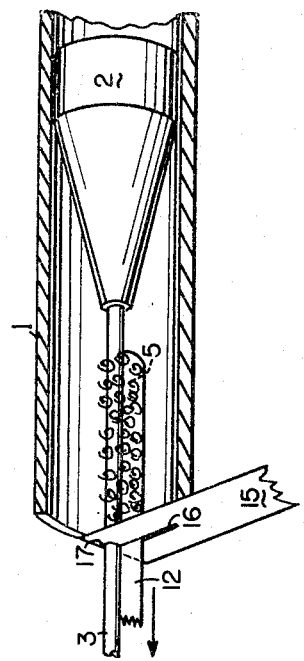
FIG. 3 illustrates an alternate method of doing the same.
Figure 2:
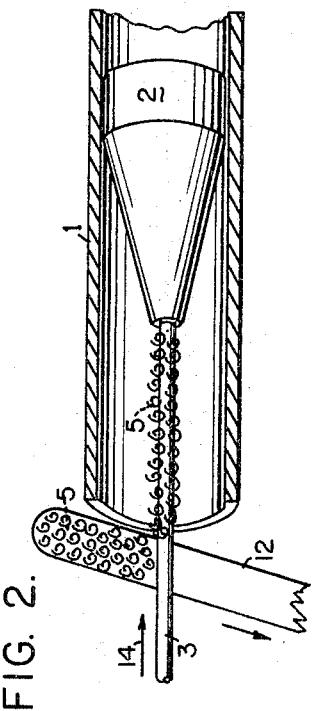
FIG. 2 illustrates one method of placing viscous material within the tube.

Continuing, adhesive 5 is assumed to have been put in place according to either of the methods shown in FIGS. 2 or 3. It is compacted between spreader plunger 2 and pressure plunger 4 by suitable opposed pressures exerted between these two elements. This can be accomplished by applying an out-of-tube-directed force upon rod 3 and an into-tube-directed force upon rod 6 at their free curved ends. These forces are shown in FIG. 1 as vectors (arrows) 7 and 8, respectively.

The actual coating process is now carried out by suitably manipulating rods 3 and 6 by varying forces 7 and 8. This can be accomplished by using two hands, or by equivalent mechanical means, but it has been found superior in practice to grasp the two curved ends of the rods like a pistol grip and to exert opposed forces upon them while simultaneously pulling the whole assembly out of tube 1 at a proper rate. It will be appreciated that this requires a greater force upon rod 3 than upon rod 6; thus vector 7 is shown longer than vector 8. Conveniently, the curved end of rod 6 rests in the crotch of the hand, between the thumb and the fingers, while the fingers curl around the curved end of rod 3.

That squeezing pressure by the hand that forces material 5 circumferentially beyond spreader plunger 2 to deposit a suitable coating upon the whole inner surface of tube 1, as shown at 10 in FIG. 1, is quite quickly learned. A slow rate of withdrawal and a large force exerted between rods 3 and 6 will result in a relatively thick coating 10, and vice versa. The combined "squeeze and pull" effort by the hand of the operator is easily "felt," with which a uniform coating 10 can be deposited.

It is preferred practice to make the coat slightly thinner at the forward and the rear ends of the coating. This decreases turbulence in the liquid entering the tube and where it leaves the coated section as well. A "step" is to be avoided at the rear end of the coating, so that the coating will not be damaged when sludge is subsequently cleaned from the tube.

Not only may a first repair be made where cavitation has ultimately caused holes in the walls of the tubes, but a second repair can also be made. Plastic inserts have sometimes been employed to repair tubes near the ends thereof. These frequently ultimately cause cavitation holes at the inward ends thereof because of lack of feathering or damage to the inserts when cleaning out sludge. To effect the second repair the inserts are removed and the whole affected length of the tube near the end is cleaned and coated according to this invention. Both ends are feathered.

A typical coating on a 5⁄8" inside diameter tube is 0.003" thick, with about half this thickness at the extreme end of the tube and at the termination of the coating within the tube; as at the left and the right of FIG. 1.

In order to deposit the preferred coating, the operator initially exerts a reduced but increasing force between the two curved ends of the rods to form the inner feathered portion of the coating, then a uniform force for the duration of the main portion of the coating, and then a decreasing force at the end of the withdrawal traverse to form the feathered portion at the end of the tube.

When the tube has pitted-through at a point or points along the length treated, additional material 5 will be forced through the hole in view of the forces exerted on the rods and the hole will be plugged. Material 5 hardens rapidly enough under these conditions so that the material forming the plug is known to remain in place. The "give" in the forces being exerted by the hand when a hole is encountered more or less automatically forces more material out through the hole, as is required.

For a 5⁄8" diameter tube being coated a distance of one foot inward from the end, 10 grams of materials provides the 0.003" coating, with sufficient material to spare to insure filling any holes encountered.

Viscous material 5 is of the general class used for caulking purposes. A particularly suitable material is an epoxy resin. This type of material consists of two components that are mixed just prior to use. The resulting combination hardens with in a relatively short time. This interval is known as the "pot life." It is for this reason that rapid processing according to this invention is desirable, if not absolutely necessary.

For optimum results a particular viscosity of the material is desirable, such as honey on a cold day, so that the material is more plastic than liquid. A cold day temperature may be taken as 60° F. This consistency is preferable so that the material will suitably coact with the forces brought into play according to this invention, while also being fluid enough to extend circumferentially all around the spreader plunger and thus to complete-coat the interior of tube 1.

A suitable material available to the trade is manufactured by the Specialties Engineering Corporation of Pasadena, Calif., and is known as "Specoat, SEC-ETA modified CL." Their "SEC-ETP" material may also be used. The letters specifying the material have the following significance; SEC, initials of the corporation; E, epoxy; T, trowelable; A, adhesive; C, caulking; L, lightweight; P, pigmented.

It has been found that a proper criterion for the consistency of the viscous material 5 is that it stay in place until the chemical reaction taking place between the two components of the epoxy harden it sufficiently to make it stay in place. This phase of the reaction takes place about half way during the interval between the mixing of the components and the completion of the chemical process.

The "pot life" of an epoxy material is the period of time during which it is workable. After this period it has hardened, or set, to such a degree that it can no longer be manipulated for any use to which it might be put. The pot life depends upon several factors and these should be given attention in carrying out processing according to this invention. The pot life of the materials specified above is approximately 15 minutes at 72° F., but only 5 minutes at 100° F. If the material is confined, as in the processing step proper herein, the pot life is only about 3 minutes. Thus, rapid processing, as provided by this invention, is required.

Since the work must progress rapidly and is ofen carried out in cramped quarters during somewhat extreme temperatures of heat or cold, as the environment may provide, a step for feeding-in the viscous material must be evolved that is both rapid and satisfactory.

One method of placing the viscous material 5 within tube 1 is illustrated in FIG. 2. The viscous material is placed on at least one side of knife (or spatula) 12. Both sides of the knife are used if a greater supply is needed. The knife is drawn across rod 3 while the rod is moved into tube 1 by the operator with his other hand holding the curved portion of rod 3 (not shown in FIG. 2). This motion is shown by vector 14. In FIG. 2 the process is shown half completed; the material has been already removed from the lower half of the knife to the rod. With material on both sides of the knife the process step is repeated. The second time the knife is scraped over the rod instead of under, as shown.

As soon as the material is placed upon rod 3 pressure plunger 4 is moved rapidly to the right with the aid of second rod 6, thereby giving the configuration shown in FIG. 1. Thereafter, the coating process is carried out, as has been explained. This process step has been found to be the most rapid way of placing material 5 in place.

A second method for placing the viscous material within tube 1 is illustrated in FIG. 3. Viscous material 5 is again placed upon one or both sides of knife 12. The knife is thrust within tube 1 and then special spatula 15 is put in position as shown, such as to block the front end of the tube while slot 16 passes over knife 12 behind material 5, which material is carried on the forward end of the blade. Both knife and spatula may be provided with handles, but these have not been shown. A notch 17 is located at the end of slit 16 in spatula 15 to allow rod 3 to pass, which rod is moved laterally within the tube as the spatula is moved into position, being crowded to the rear of the tube as shown in FIG 3. In this method only knife 12 is moved, being withdrawn after the spatula is in place. Material 5 is thus left upon rod 3 inside of tube 1, or within the tube itself, adjacent to spreader plunger 2. Spatula 15 is then removed and pressure plunger 4 is moved to the right along rod 3 by being pushed by rod 6 until the configuration shown in FIG. 1 is accomplished.

In continuous processing it may be found that some of the viscous material remains associated with the tools after the coating of a given tube is completed. This material can be used in the next tube to be processed by quickly lowering the tool assembly from the completed tube to the one just below it. Normally, additional material is added before coating the second tube, using one of the methods according to FIGS. 2 or 3.

It is also possible to introduce viscous material 5 in the required position in front of spreader plunger 2 by expelling it from a caulking gun. The nozzle thereof is inserted into the end of the tube, with pressure plunger 4 back on rod 3 and thus out of the way. Immediately after the deposit of the material within the tube pressure plunger is moved into the tube and to the start-coating position of FIG. 1. In tubes of small size (such as ⅝″ inside diameter or less, there may not be room enough for the nozzle of the caulking gun and so one of the methods of FIGS. 2 or 3 must be used.

With any of the methods of introducing the viscous material it is important that "coating force" not be exerted between the first and second rods 3 and 6 until withdrawal is started, lest a deposit of some sort be laid down during the insertion phase of the processing. It is fully possible to note by the resistance of the rods upon the grip of the hand whether viscous material is merely being assembled in front of spreader plunger 2, or whether coating is being accomplished.

Before the coating process is carried out in a used condenser it is necessary that the many tubes be freed of silt and dried. In addition, the tubes must be cleaned to allow a bond between the coating and the virgin metal. Cleaning can be accomplished by employing acid, by sand blasting, or by employing sandpaper according to some satisfactory method of manipulation. The first two methods are undesirable in that pits or holes in the used condenser tubes are enlarged and also because these methods are either time-consuming or are hard to control.

Figure 4:
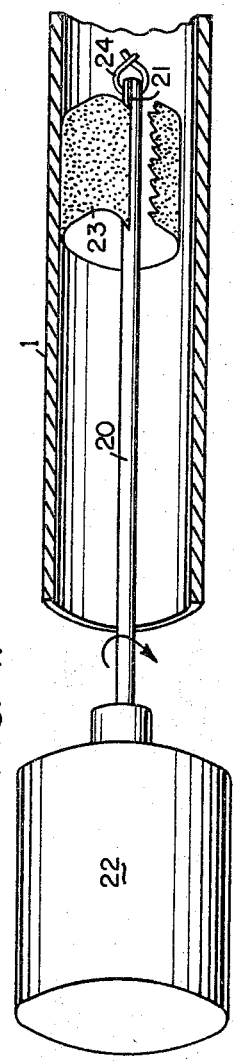
FIG. 4 illustrates a preliminary cleaning step.

FIG. 4 shows means for accomplishing a preferred form of cleaning. The method involves rotating sandpaper within the tube to be cleaned. This gives the required cleaning and also circumferential scoring transverse to the axis of the tube. Such scoring is highly desirable in forming a strong bond between the coating and the inner surface of the tube.

Numeral 20 indicates a rotatable shaft, having a split right end, slot 21. A motor 22, which may be powered by electricity or compressed air, is attached to the shaft and may rotate it at a speed of approximately 1760 revolutions per minute. The direction of rotation with respect to the configuration of the sandpaper is clockwise, as one looks into the tube. Within the split end of the shaft a piece of abrasive paper 23, approximately 2″ wide and 8″ long, is placed, with one end of the piece of paper in the slot. This is longer than can be clearly illustrated in FIG. 4 and so paper 23 has been shown with much of its length torn off, according to drafting practice. In use, the paper is wound in a more or less close spiral, inserted in the tube and then the motor started. Since the loss of the paper within a tube would be an annoyance, a short piece of relatively flexible wire 24 is passed through a hole in shaft 20 transverse to slit 21 and is twisted once by hand. This prevents the sandpaper from axially departing from the slot 21. It has been found that the roughness of the paper and the spiral configuration does not require any special measures to retain the paper within the slot radially.

Shaft 20 may have a diameter of the order of ¼″ and paper 23 is preferably rough, as with 40 to 60 mesh granules. Such roughness is required to remove the scale deposit normally present within used tubes. Motor 22 is held in the hand, and being energized, paper 23 is axially traversed within the tube while it rapidly revolves at the same time. Typically, two passes in and two passes out are sufficient to clean one tube and one paper 23 will clean about ten tubes before it needs to be replaced. The "dust" resulting from the cleaning is blown out by compressed air as the last step in the cleaning process.

It is also possible to clean and score the inner surface of tubes by placing sandpaper around the periphery of a relatively soft solid rubber cylinder that is mounted on shaft 20 in the place of sandpaper 23 in FIG. 4. However, this arrangement has been found inferior to that shown in FIG. 4, since if the sandpaper-covered cylinder is oversize it cannot enter the tube and if it is undersize the assembly must be wobbled transversely as it is translated in and out of the tube. Also, the cylinder arrangement will clean only a very few tubes before the sandpaper must be replaced, as compared to the assembly shown in FIG. 4. This occurs because of the greater resiliency of the spirally formed all-sandpaper element 23 and also because when shaft 20 is urged inwardly the several convolutions of the spiralled paper lag behind the position of the slot in the shaft, and when the shaft is returned outwardly the opposite axial configuration of the paper occurs. This tends to make the sandpaper spiral self-cleaning as compared with the sandpaper-covered cylinder, which clogs rapidly.

Cleaning with a wire brush is not recommended, since this tends to polish, to "surface latence," and provides a poor surface for the adherence of the coating material. Cleaning with scoring is particularly required before coating copper alloy tubes because the molecular structure thereof tends to prevent an adherent coating.

Sandpaper has been used as a generic term herein and also includes emery cloth, emery paper and equivalent abrasive materials.

Still other variations in the details of processing and in the means employed to accomplish the processing may be made without departing from the spirit and scope of this invention, as defined by the following claims.

Having thus fully described the invention and the manner in which it is to be practiced, I claim:

1. The process of coating the interior of a tube near an end thereof which includes the steps of:
   (a) inserting a spreader plunger upon a rod within the end of said tube,
   (b) placing an amount of viscous material between said spreader plunger and the end of said tube,
   (c) moving a pressure plunger upon said rod within said tube toward said spreader plunger to position said viscous material in front of said spreader plunger,
   (d) positioning said spreader plunger, said rod, said material and said pressure plunger within said tube until said spreader plunger has reached the depth to which said tube is to be coated,
   (e) withdrawing said thus positioned elements from the same end of said tube while directly maintaining a force between said pressure plunger and said spreader plunger to urge said viscous material beyond said spreader plunger,
   whereby said viscous material is deposited upon the interior of said tube behind said spreader plunger to coat said tube.

2. The process of coating a tube according to claim 1 in which:
   (a) said force is minimal at the start of said withdrawing step, is increased to a greater value during said step, and is reduced to a minimal value at the end of the step,
   whereby said coating is feathered in thickness at both ends thereof to minimize turbulence during subsequent use involving liquid flow.

3. The process of coating a tube according to claim 1 in which said viscous material is placed between said spreader plunger and the end of said tube by the steps;
   (a) applying said viscous material to at least one side of a knife, and
   (b) scraping said viscous material from said knife upon said rod while inserting said rod into the end of said tube.

4. The process of coating a tube according to claim 1 which additionally includes as an initial step;
   (a) axially traversing a unidirectionally whirling piece of sandpaper within the interior of the tube to be coated
   to clean and circumferentially score said interior.

5. The process of coating a tube according to claim 1 in which;
 (a) said force is directly maintained manually by exerting that force as a squeeze between the crotch formed between the thumb and fingers and the fingers as a group of one hand.

References Cited

UNITED STATES PATENTS

| 694,196 | 2/1902 | Rose | 138—97 |
| 1,758,810 | 3/1930 | Austin et al. | 117—49 |
| 2,262,042 | 11/1941 | Pennella | 138—97 |
| 2,779,042 | 1/1957 | Benny | 15—104.09 |
| 2,966,373 | 12/1960 | Yount | 138—97 X |

FOREIGN PATENTS

| 685,637 | 1/1953 | Great Britain. |
| 345,736 | 5/1960 | Switzerland. |

ALFRED L. LEAVITT, *Primary Examiner.*

E. B. LIPSCOMB, *Assistant Examiner.*